(12) United States Patent
Jancart et al.

(10) Patent No.: US 11,351,805 B2
(45) Date of Patent: Jun. 7, 2022

(54) DECORATED NATURAL LEATHER

(71) Applicant: AGFA NV, Mortsel (BE)

(72) Inventors: Dieter Jancart, Mortsel (BE); Rudi Lamproye, Mortsel (BE); Guido Fransen, Mortsel (BE)

(73) Assignee: AGFA NV, Mortsel (BE)

( * ) Notice: Subject to any disclaimer, the term of this patent is extended or adjusted under 35 U.S.C. 154(b) by 311 days.

(21) Appl. No.: 16/498,491

(22) PCT Filed: Apr. 4, 2018

(86) PCT No.: PCT/EP2018/058542
§ 371 (c)(1),
(2) Date: Sep. 27, 2019

(87) PCT Pub. No.: WO2018/189002
PCT Pub. Date: Oct. 18, 2018

(65) Prior Publication Data
US 2020/0101783 A1  Apr. 2, 2020

(30) Foreign Application Priority Data
Apr. 14, 2017  (EP) ..................... 17166694

(51) Int. Cl.
*B41M 5/00* (2006.01)
*B41M 3/14* (2006.01)
(Continued)

(52) U.S. Cl.
CPC ............ *B41M 5/0076* (2013.01); *B41M 3/14* (2013.01); *B41M 5/0047* (2013.01); *C08G 18/73* (2013.01);
(Continued)

(58) Field of Classification Search
CPC .............. B41M 5/0041; B41M 5/0047; B41M 5/0076; B41M 2205/40; B41M 3/14; B41M 5/00; C14C 1/00; C08G 18/73; C09D 11/101; C09D 11/322; C09D 175/04; D06P 1/44; D06P 1/5285; D06P 3/32; D06P 5/2005; D06P 5/30; C14B 1/56

See application file for complete search history.

(56) References Cited

U.S. PATENT DOCUMENTS

| 2008/0008864 | A1 | 1/2008 | Itoh |
| 2010/0233441 | A1 | 9/2010 | Kubota et al. |
| 2016/0067984 | A1 | 3/2016 | Chung |

FOREIGN PATENT DOCUMENTS

| CN | 101517097 A | 8/2009 |
| CN | 204332248 U | 5/2015 |

(Continued)

OTHER PUBLICATIONS

Videojet, "Methods for direct part marking", © 2014 Videojet Technologies Inc. (Year: 2014).*

(Continued)

*Primary Examiner* — Manish S Shah
(74) *Attorney, Agent, or Firm* — Leydig, Voit & Mayer, Ltd.

(57) ABSTRACT

A manufacturing method of decorated natural leather includes applying a base coat on crusted leather, inkjet printing a decorative image on the base coat using one or more pigmented inkjet inks, and applying one or more identification codes.

13 Claims, 5 Drawing Sheets

(51) Int. Cl.
- *C08G 18/73* (2006.01)
- *C09D 11/101* (2014.01)
- *C09D 11/322* (2014.01)
- *C09D 175/04* (2006.01)
- *C14C 1/00* (2006.01)

(52) U.S. Cl.
CPC .......... *C09D 11/101* (2013.01); *C09D 11/322* (2013.01); *C09D 175/04* (2013.01); *C14C 1/00* (2013.01); *B41M 2205/40* (2013.01)

(56) References Cited

FOREIGN PATENT DOCUMENTS

| | | | | |
|---|---|---|---|---|
| EP | 3388490 | * | 10/2018 | .......... B41M 5/0047 |
| GB | 2510696 A | | 8/2014 | |
| JP | 09-059700 | * | 3/1997 | .......... B41M 5/0047 |
| JP | 2003-251907 A | | 9/2003 | |
| JP | 2003336179 A | | 11/2003 | |
| JP | 2010-185055 A | | 8/2010 | |
| JP | 2014-055210 A | | 3/2014 | |
| WO | 01/32434 A1 | | 5/2001 | |
| WO | 2008/044515 A1 | | 4/2008 | |
| WO | 2009/121605 A2 | | 10/2009 | |
| WO | 2013/135828 A1 | | 9/2013 | |

OTHER PUBLICATIONS

Direct Part Marking: More than just a code on a surface, 2013 Datalogic (Year: 2013).*
Videojet Explores How Direct Part Marking Solutions Can Safeguard the Automotive Industry, Videojet Technologies India Pvt. Ltd Aug. 6, 2015, 05:30 BST (Year: 2015).*
Machine translation of JP 09-059700, published on Mar. 1997 (Year: 1997).*
Office Action dated Mar. 11, 2021 relating to South Korean Patent Application No. 10-2019-7030003 (English translation), 6 pages.
Office Action dated Oct. 28, 2020 relating to Japanese Patent Application No. 2019-555797 (English translation included), 15 pages.
Official Communication issued in International Patent Application No. PCT/EP2018/058542, dated Jun. 22, 2018.

* cited by examiner

DECORATED NATURAL LEATHER

CROSS REFERENCE TO RELATED APPLICATIONS

This application is a 371 National Stage Application of PCT/EP2018/058542, filed Apr. 4, 2018. This application claims the benefit of European Application No. 17166694.4, filed Apr. 14, 2017, which is incorporated by reference herein in its entirety.

BACKGROUND OF THE INVENTION

1. Field of the Invention

The present invention relates to the manufacturing of decorated natural leather and leather articles therewith.

2. Description of the Related Art

Figure 1:
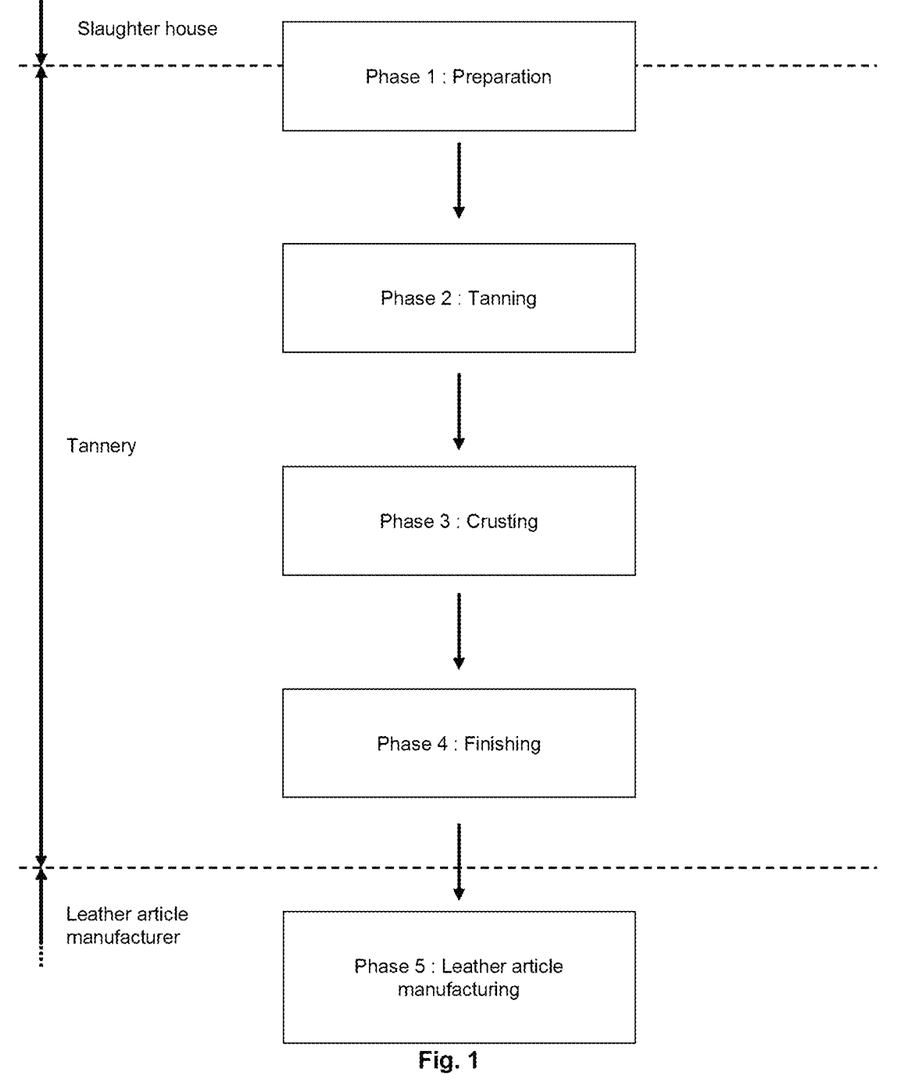
FIG. 1 shows a flow chart of the traditional manufacturing of leather articles involving the different phases and locations.

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Leather by itself is already perceived as a luxury product, but personalization and customization, for example by decoration, can further enhance this luxury feel. Natural leather has been decorated in the past by screen printing. However, screen printing is labour intensive and for each colour an individual screen is required. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO 01/32434 A (GILHAM) and US 2016067984 A (CHUNG). Aspects such as image quality, light fading of transferred dyes and scratch resistance needed further improvement.

Light fading of dyes can be resolved by using pigmented inks. GB 2510696 A (SERICOL) discloses a method of printing onto a leather or synthetic leather substrate by depositing a primer layer onto the substrate, the primer comprising a thermoplastic resin and water; at least partially drying and/or curing the primer; inkjet printing a pigmented hybrid solvent/radiation curable ink onto the primer layer; drying and curing the hybrid ink layer.

Recently high quality decorated leather has been obtained by a method of printing "into" tanned leather with pigmented inks. WO 2013/135828 A (CODUS) discloses a method of printing into tanned leather comprising the steps of a) applying ink acceptor directly to the surface of the leather; b) applying ink directly onto the acceptor by inkjet; c) applying an additive to the ink; d) heating a surface of a barrier which is substantially impervious to the ink; and e) contacting the heated barrier with the ink acceptor, additive and ink on the leather surface directly to soften the additive, ink acceptor and ink into the leather such that the ink penetrates into the leather.

Printed leather is cut into leather pieces which are sewed together into leather articles, such as shoes or handbags. By inkjet printing on tanned leather, the decoration now moves from the leather article manufacturer to the tannery, while the cutting and sewing of printed leather into leather articles remains at the leather article manufacturer. This causes logistic problems and time delays.

Hence, there is a need for obtaining a more efficient and economical method of manufacturing high quality decorated natural leather articles allowing personalization and customization and having a short delivery time to the customer, as high delivery times reduce the luxury feel.

SUMMARY OF THE INVENTION

In order to overcome the problems described above, preferred embodiments of the present invention have been realised with a manufacturing method for decorating natural leather described below.

By applying one or more identification codes to the crust leather, an image printed in the tannery can be identified without error at the leather article manufacturer, who can then immediately proceed to cut the required leather pieces from the printed image, thereby avoiding errors and minimizing waste.

The one or more identification codes can also be advantageously used for other reasons, like track-and-trace and stock monitoring by both the tannery and the leather article manufacturer. Especially when the identification code is machine readable this results in economical advantages as identification can then proceed in a fast manner.

The decorative image supplied by a computer server can also be inkjet printed without clear separation of intended leather pieces. This has the advantage that until effective sale of a leather article, a brand owner can maintain secrecy on the shape of a new collection of the leather article, e.g. a luxury handbag, since the tannery can be left unaware of the shape of leather pieces to be cut out and their possible assembly.

These and other objects of the present invention will become apparent from the detailed description hereinafter.

BRIEF DESCRIPTION OF THE DRAWINGS

FIG. 2 shows a process of leather manufacturing according to the present invention wherein the full arrows relate to a physical transport and the dashed arrows relate to an exchange of information, e.g. over the internet. On a computer server (18) data is stored about leather articles that are manufactured by the leather article manufacturer (10). Customers can view the articles over a digital connection (15, 16), such as the internet, from a shop (12) or a website (11) at home. The customer may select a specific leather article with a desired decoration and personalization, whereafter this selection is communicated via a digital connection (15,16) to the computer server (18) together with an identification code. A hide (2) from a cow (1) is then tanned, crusted and base-coated at a tannery (3) which retrieves and uses the desired decoration and data of the selected leather article from the computer server (18) by a digital connection (17) to apply it on the base coated leather crust by inkjet printing (4). The inkjet printed leather (5) including inkjet printed leather pieces (7) having a printed decoration (8) and a printed identification code (9) is then transported to the leather article manufacturer (10). The leather article manufacturer (10) uses the printed identification code (9) to assemble the desired leather article (13) from the inkjet printed leather pieces (7) cut out from the inkjet printed leather (5). The leather article manufacturer (10) uses the printed identification code (9) to retrieve the correct delivery address obtained from the shop (12) or the website (11) and delivers the leather article (13) to the customer.

DETAILED DESCRIPTION OF THE PREFERRED EMBODIMENTS

Definitions

The term "crusted leather" or "crust leather" means leather that has been tanned and crusted, but not finished.

The term "monofunctional", as used in monofunctional monomers and oligomers, means containing a single polymerizable group.

The term "polyfunctional", as used in monofunctional monomers and oligomers, means containing a two, three or more polymerizable groups.

The term "oligomer" means a compound polymerized from 2 to 50 monomers.

Manufacturing Methods of Decorated Natural Leather

Figure 4:
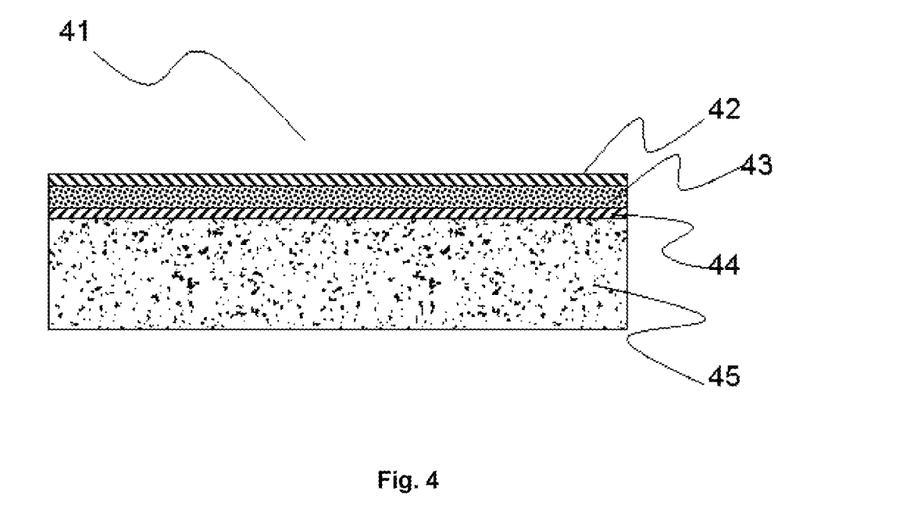
FIG. 4 is a schematical representation of inkjet printed leather (41) including on the crusted leather (45), a base coat (44), the decorative image (43) and a protective top coat (42).

A manufacturing method of decorated natural leather according to a preferred embodiment of the present invention includes the steps of:

applying a base coat (44) on crusted leather (45);
inkjet printing (4) a decorative image (8) on the base coat (44) using one or more pigmented inkjet inks; and
applying one or more identification codes (9).

The base coat applied on the crust leather is required to provide a level of image quality commensurate to the luxury aspect of leather. Natural leather is rather porous, inter alia due to the hairs that have been removed from the hide, and an inkjet ink having low viscosity would penetrate rapidly into the leather resulting in poor image quality.

The decorative image is inkjet printed on the base coat using one or more pigmented inkjet inks. Contrary to most dyes, pigmented inkjet inks guarantee a good light fastness as the leather articles are often used in outdoor conditions. The one or more pigmented inkjet inks may be aqueous inkjet inks, but are preferably UV curable pigmented inkjet inks, because UV curing rapidly "freezes" the inkjet printed decorative image. The resulting good image quality contributes further to the luxury aspect of the decorated leather article.

There is no real restriction on how the one or more identification codes are applied. They can be applied by a label, writing, printing, laser marking or the like, but in a preferred embodiment they are applied by inkjet printing. The advantage thereof is that they can be inkjet printed together with decorative images minimizing errors and reducing economical cost. In a particularly preferred embodiment, the one or more identification codes are machine readable. The identification code may also be integrated into the decorative image. Labels have the disadvantage that they can get detached from the leather in manufacturing steps after the inkjet printing, e.g. application of a top coat. However labels have the advantage that they can be easily attached to the back side of the leather thereby maximizing the printable area of the front side of the leather.

In an alternative embodiment, an identification code is inkjet printed prior to the application of the decorative image. This can be advantageously used, for example, by linking a certain leather crust to a digital file that stores information of the shape and defects on the leather crust. This information is obtained by scanning the leather crust for its shape and defects. Leather is a natural product and is this not a homogenous product. It may contain holes, bite marks, scratch marks for barbed wire and the like, all influencing the image quality. These areas are then stored in the digital file as non-printable areas.

Figure 2:
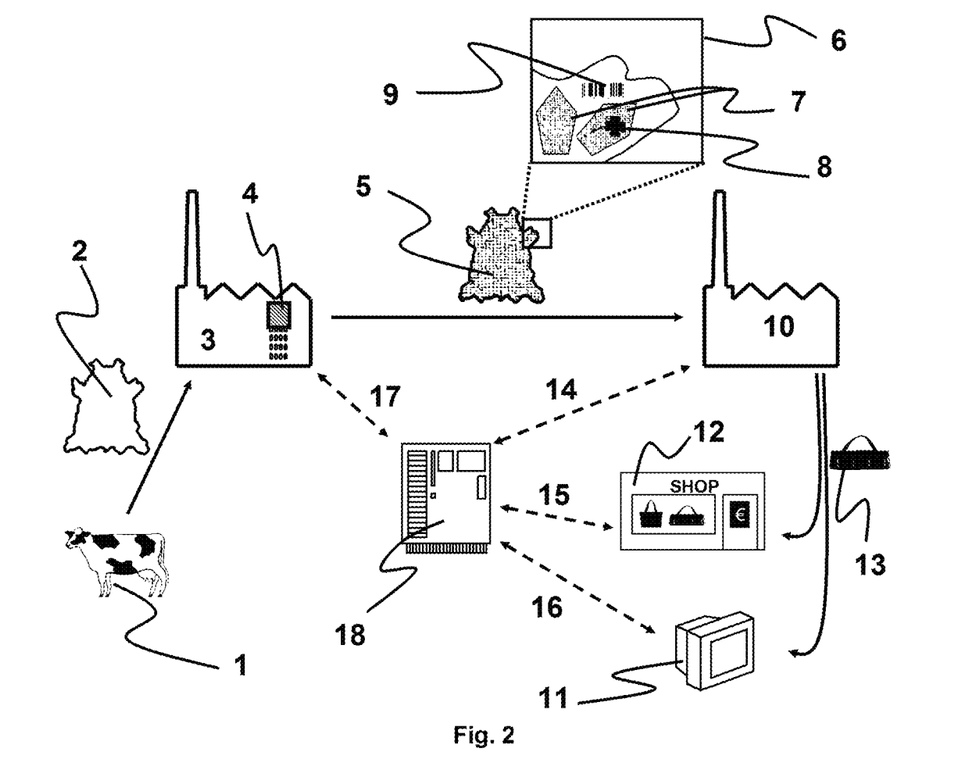

A plurality of identification codes may be used, for example if different decorative images are inkjet printed on the base coated crust leather intended for a plurality of leather articles. In such a case, each identification code preferably corresponds to a single leather article. The inkjet printed leather pieces (7) for this leather article (13) are then identified by the leather article manufacturer (10) from the identification code (6) and cut out from the printed leather (5).

For enhancing the scratch resistance, a top coat may be applied onto the decorative image and the base coat.

In a preferred embodiment of the manufacturing method, the crusted leather, the base coat, the decorative image and the top coat are heat pressed. Such a method is known from WO 2013/135828 A (CODUS) to make at least part of the sandwich "base coat/decorative inkjet image/top coat" penetrate and fuse into the leather.

By scanning the surface of the natural leather for holes, bite marks or other surface defects prior to inkjet printing, the detected holes and defects could be taken into account as non-printable area when composing the image with the desired leather pieces and individual decorations. This way minimal waste of leather is obtained as a computer calculates the optimal lay-out of the different leather pieces.

Figure 5:
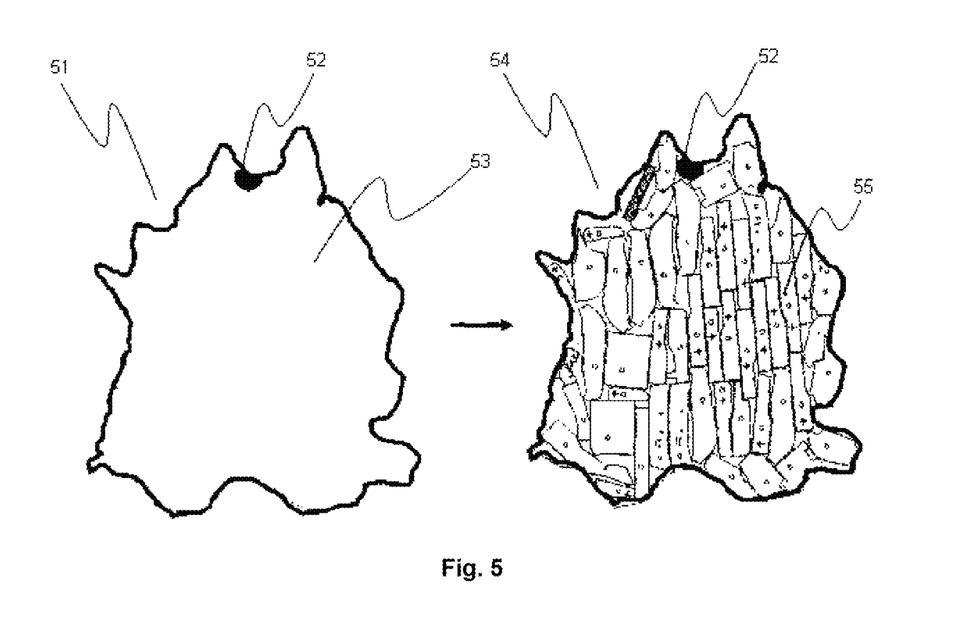
FIG. 5 shows, preferably on a computer screen, a leather image (51) having a non-printable area (52), such as a bite mark, and a printable area (53), wherein leather pieces are nested as sub-images (55) in order to obtain a leather image containing nested sub-images (54).

The crusted leather is preferably scanned prior to inkjet printing in order to identify the printable area (53) and the non-printable area (52), such as a hole or a bite mark. The scanned leather image (51) can be used for nesting sub-images (55), whereafter the leather image containing nested sub-images (54) is inkjet printed together with one or more identification codes on the base coat of the crusted leather.

Decorated Natural Leather and Leather Articles

Figure 3:
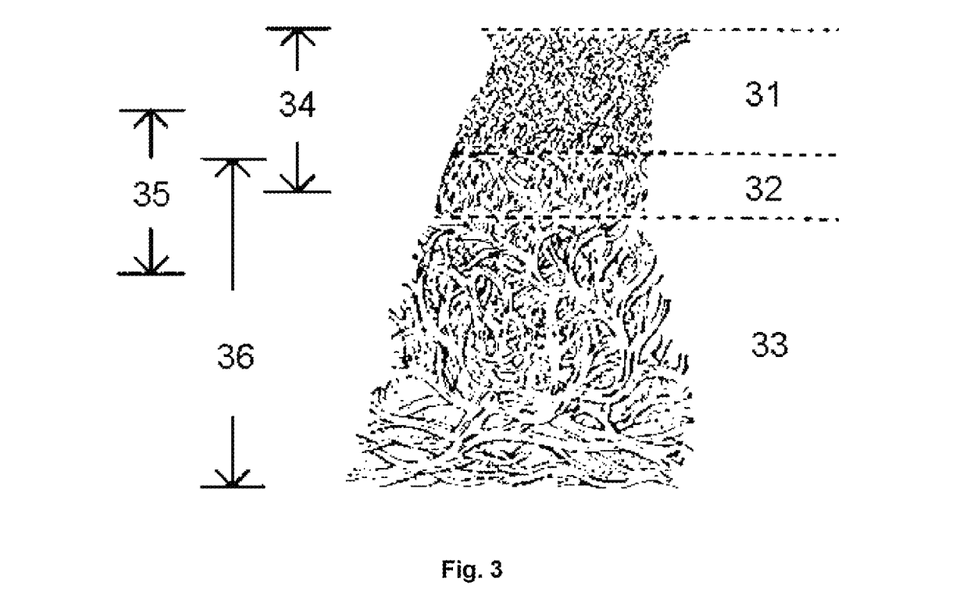
FIG. 3 shows schematically a cross-section of an animal skin including a grain (31) and a corium (33) separated by a junction of grain and corium (32). The different leathers made from the animal skin include full grain leather (34), top grain leather (35) and split leather (36).

Natural leather comes in different grades (see FIG. 3), such as full grain (34), top grain (35) which is essentially full-grain but with part of the grain layer sanded and the underlying split layer removed, and split leather (36). For the latter, the underlying layer of the hide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books and stationary, packaging, equestrian articles and the like.

The inkjet printed decorative image (43, 54) may be composed of nested sub-images (55) to be cut out as leather pieces.

In one embodiment, a single identification code is used for all the nested sub-images. The information of which sub-image is intended for which leather article is then stored via the digital connection (17) on the computer server (18).

In another embodiment, a plurality of identification codes are used for identifying different sets of leather pieces intended for multiple leather articles, or otherwise each leather piece may even have its own identification code.

Identification Codes

One or more identification codes (9) are applied, preferably, on to the base coat. The base coat ensuring good quality of the decorative images, is also providing good readability of the one or more identification codes.

Figure 6:
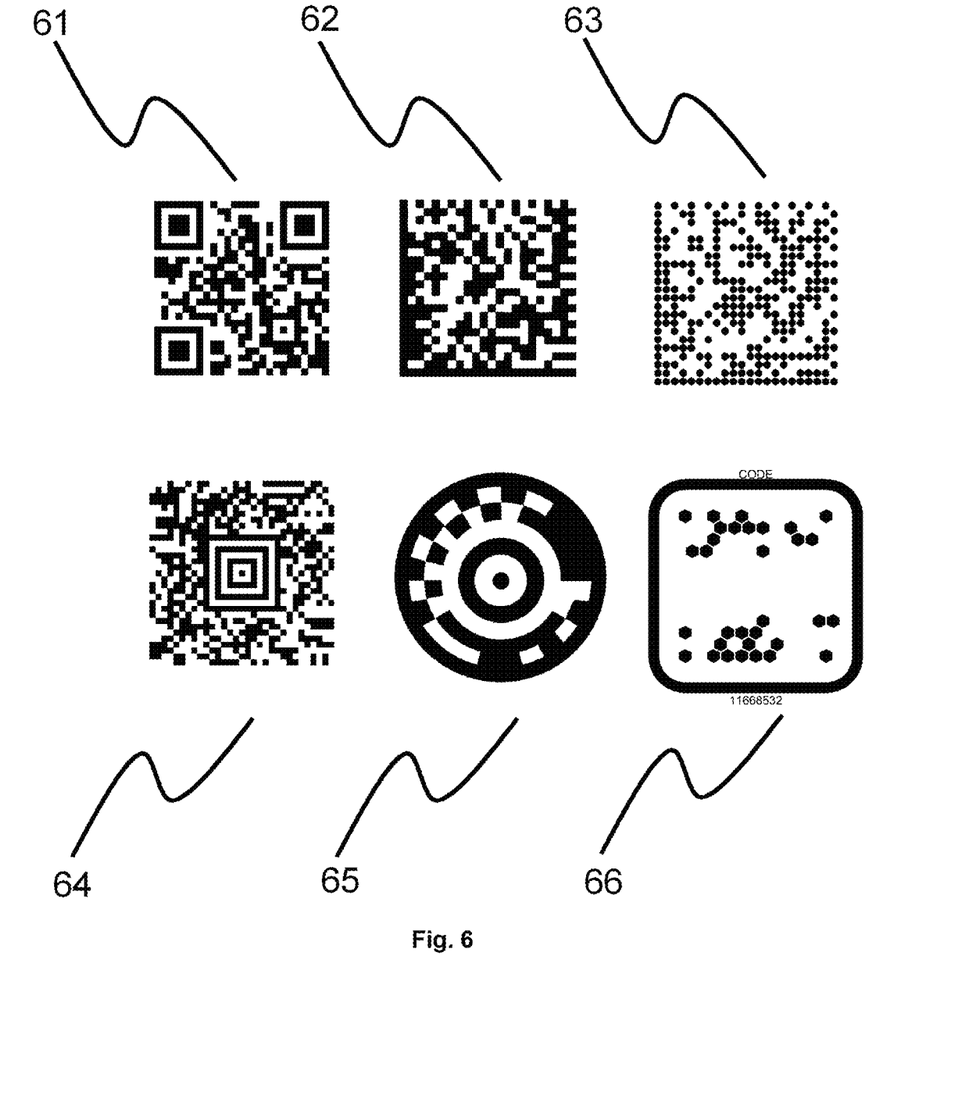
FIG. 6 shows six different 2D codes.

The identification code may include alphanumerical data, such as a name and/or numbers, but preferably it is a machine readable identification code. The latter allows for faster identification without errors. There is no restriction on the type of machine readable identification code. It may be a simple bar code, but it may also be a so-called 2D code. Preferred 2D codes include a barcode, a QR code, a datamatrix code, a cool-data-matrix code, an aztec code, an upcode, a trillcode, a quickmark code, a shot code, a mcode, a beetagg and the like. Examples of such 2D codes are illustrated in FIG. 6.

In a preferred embodiment, the identification code is included in the decorative image and may be included also in the final leather article. The latter allows for verifying the authenticity of an expensive luxury handbag by scanning the identification code with a smart phone. The identification code allows then to connect to a website showing pictures of the handbag and any personalization features printed thereon that are stored in a database where they are retrievable by the identification code. For maintaining the luxury effect, the identification code may then be located on the inside of the handbag or the identification code may itself be designed as what appears to be a decorative feature. A suitable technology for this is described in WO 2015/140157 (AGFA), disclosing an identification (de)coding method for an identification code having curves forming a non-intersecting, continuous line having changing thicknesses in the curves.

From the FIG. 2, it should be clear that the identification code can be used for multiple reasons, such as identifying a leather article to be manufactured for a customer with the decorated natural leather; cutting the decorated natural leather; identifying the customer of the leather article; authentication of the leather article; and delivering the leather article to the customer.

The identification code can be used for track-and-trace purposes throughout the manufacturing chain in both the tannery and the leather article manufacturer, and even in the delivery from the factory of the leather article manufacturer to the shop where it was ordered or the home of the customer. If multiple factories of one or more leather article manufacturers are involved, then the identification code can be efficiently used in the logistics process for getting the inkjet printed leather to the correct factories.

The identification code can be useful after the leather article was delivered to the customer, for example, for checking the authenticity of the leather article. This is mainly of importance for expensive leather articles from exclusive manufacturers like Gucci™ or Louis-Vuitton™. The identification code may also be used to order an exact replica of the leather article at the original manufacturer or to get a lost or stolen leather handbag back to its rightful owner.

The identification code may also serve for marketing purposes, such as customer engagement. Customer engagement is a business communication connection between an external stakeholder (consumer) and an organization (company or brand). The connection can take place online or offline. Preferably the connection is made online, for example when the external stakeholder scans the identification code with his smartphone and is taken to a certain website of the organization to enhance the overall customer experience.

The identification code is preferably inkjet printed by one or two colour pigmented inkjet inks providing a good contract for reading. For example on a black dyed crusted leather, the identification code may be printed with a single white pigmented inkjet ink, while on a green dyed crusted leather a combination of black and white pigmented inkjet inks may be used for inkjet printing the identification code with good contrast. The identification code may also be printed in other colours than black and white, for example yellow and dark blue.

The identification code may be applied on the back of the crusted leather, but is most preferably applied to same side of the leather crust as the decorative image.

Decorative Images

There is no real limitation on the type of decorative image (8) inkjet printed (4) on the base coat (44) using one or more pigmented inkjet inks.

The decorative image may consist of a single colour or it may include multiple colours such as black, white, cyan, magenta, yellow, red, orange, violet, blue, green and brown.

The decorative image may be printed as an uninterrupted image where individual leather pieces are cut out or the decorative image may consist of sub-images, for example representing the different leather pieces required to assemble a leather article. In the latter case the sub-images (55) are preferably nested into a decorative image containing sub-images (54) as shown in FIG. 5. By nesting sub-images, the waste of unused leather having a printable area (53) can be minimized, which represents a clear economic benefit.

The decorative image may also include cutting lines for facilitating the cutting of leather pieces. Cutting may be performed manually using these cutting lines, but is preferably done by using some kind of automation for the cutting of leather, such as e.g. implemented in the Versalis™ cutting machines from LECTRA.

Alternatively, no cutting lines are printed, and the whole cutting pattern is stored in a computer, such as the computer server (8) of FIG. 2. For example, U.S. Pat. No. 5,757,950 (DUERKOPP ADLER AG) discloses a process for cutting or stamping individual parts from an animal skin in which the contours of the individual parts are stored in a computer and can be assembled to form a cutting pattern, and, for optimizing the cutting, the cutting pattern is established individually as a function of the quality of the skin and is projected by a projection device onto the skin, with which the advantages of large-area nesting can be combined with the advantages of small-area cutting or stamping.

Base Coats

The base coat applied on the crust leather is required to provide a level of image quality commensurate to the luxury aspect of leather as the low viscosity of inkjet inks lets them penetrate rapidly into the leather resulting in poor image quality.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat.

Suitable polyurethanes include Urepal™ PU147 and PU181 from CHEMIPAL S.p.A.; Melio™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat is preferably in the range of 1 to 6 $g/m^2$.

Suitable polyamides include the PA emulsion types ED310 and 161148 CX from MICHELMAN. The dry weight of the polyamide in the base coat is preferably less than 7 $g/m^2$, more preferably less than 5 $g/m^2$.

Although polyurethanes and/or polyamides are preferred as the polymers for the base" coat, other polymers may be used preferably in combination with the polyurethanes and/or polyamides. Such polymers preferably have an elongation at break of more than 200%, more preferably 300%. The elongation at break is measured according to ISO527-2, for example, with a MTS Exceed™ testing apparatus from MTS Sustems Corporation.

A suitable polymeric acrylate emulsion is Bioflex™ KGA from LMF Biokimica.

A cross-linker may be incorporated in the base coat to improve the strength of the base coat and the adhesion to crust leather. Preferred cross-linkers include aldehyde based cross-linkers such as formaldehyde, melamine formaldehyde derivatives, urea formaldehyde resins, glyoxal and gluraraldehyde, epoxides, oxazolines, carbodiimides and isocyanates, isocyanates being particularly preferred. The dry weight of the cross-linker in the base coat is preferably less than 1.4 $g/m^2$, more preferably less than 1.0 $g/m^2$.

The base coat may be applied by spraying or by any coating technique known, such as knife coating, extrusion coating, slide hopper coating and curtain coating.

Pigmented Inkjet Inks

The one or more pigmented inkjet inks that are inkjet printed on a base coat of crusted leather may be selected from aqueous pigmented inkjet inks, solvent based pigmented inkjet inks and UV curable pigmented inkjet inks. In a preferred embodiment, the one or more pigmented inkjet inks are UV curable inkjet inks.

The one or more pigmented inkjet inks preferably contain organic colour pigments as they allow for obtaining a high colour gamut on natural leather. Carbon black and titanium dioxide are inorganic pigments which can be advantageously used in the present invention for composing black respectively white pigmented inkjet inks.

A colour pigment may be chosen from those disclosed by HERBST, Willy, et al. Industrial Organic Pigments, Production, Properties, Applications. 3rd edition. Wiley-VCH, 2004. ISBN 3527305769. Suitable colour pigments are disclosed in paragraphs [0128] to [0138] of WO 2008/074548 (AGFA GRAPHICS).

In a preferred embodiment, the one or more pigmented inkjet inks form a CMYK(W) or CRYL(W) inkjet ink set.

Pigment particles in inkjet inks should be sufficiently small to permit free flow of the ink through the inkjet-printing device, especially at the ejecting nozzles. It is also desirable to use small particles for maximum colour strength and to slow down sedimentation.

The numeric average pigment particle size of an organic colour pigment and an inorganic black pigment is preferably between 0.050 and 1 μm, more preferably between 0.070 and 0.300 μm and most preferably between 0.080 and 0.200 μm. The determination of the numeric average particle diameter is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

A white pigment preferably has a numeric average pigment particle size larger than 180 nm in order to have a strong opacifying capability. Suitable white pigments are given by Table 2 in [0116] of WO 2008/074548 (AGFA GRAPHICS). The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548 (AGFA GRAPHICS).

When using UV curable pigmented inkjet inks, polymerizable compounds and at least one photoinitiator is present in the inkjet ink.

Any polymerizable compound commonly known in the art may be employed. The polymerizable compound may be any monomer or oligomer found in the Polymer Handbook Vol 1+2, 4th edition, edited by J. BRANDRUP et al., Wiley-Interscience, 1999. An oligomer in the present invention is understood to contain 2 to 8 repeating monomeric units. Preferred monomers and oligomers are those listed in [0106] to [0115] in EP 1911814 A (AGFA).

Preferably a monomer or oligomer capable of free radical polymerization is used as polymerizable compound. A combination of monomers, oligomers and/or prepolymers may also be used. The monomers, oligomers and/or prepolymers may possess different degrees of functionality, and a mixture including combinations of mono-, di-, tri- and higher functionality monomers, oligomers and/or prepolymers may be used. However preferably an amount of at least 60 to 100 wt % of monofunctional polymerizable compounds is used in the UV curable pigmented inkjet ink with the wt % based on the total weight of the inkjet ink. The viscosity of the radiation curable inkjet inks can be adjusted by varying the amount of specific monomers and oligomers.

The UV curable inkjet ink contains one or more photoinitiators, preferably one or more free radical photoinitiators. A free radical photoinitiator is a chemical compound that initiates polymerization of monomers and oligomers when exposed to actinic radiation by the formation of a free radical.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

In a particularly preferred embodiment, the one or more photoinitiators include an acylphosphine oxide photoinitiator and a thioxanthone photoinitiator. Such a combination allows for fast UV curing with UV LEDS emitting above 370 nm. UV LEDs are more economical in operating the inkjet printing than mercury lamps.

In order to increase the photosensitivity further, the UV curable inkjet ink may additionally contain co-initiators. Suitable examples of co-initiators can be categorized in three groups: (1) tertiary aliphatic amines, such as methyldiethanolamine and N-methylmorpholine; (2) aromatic amines such as 2-(dimethylamino)ethylbenzoate; and (3) (meth) acrylated amines such as dialkylamino alkyl(meth)acrylates and N-morpholinoalkyl-(meth)acrylates. The preferred co-initiators are aminobenzoates.

A preferred amount of photoinitiator and co-initiator is 0.1-30 wt %, and most preferably 5-15 wt % of the total weight of the UV curable inkjet ink.

The one or more pigmented inkjet inks may contain further additives such as surfactants, polymerization inhibitors and dispersants for the colour pigments.

The preparation of pigmented UV curable inkjet inks is well-known to the skilled person. Preferred methods of preparation are disclosed in paragraphs [0076] to [0085] of WO 2011/069943 (AGFA).

Protective Top Coats

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

For enhancing the scratch resistance, a protective top coat may be applied onto the decorative image and the base coat. The top coat preferably includes a cross-linker and a polymer or copolymer based on polyurethane and/or polyamide.

The protective top coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

Suitable polyurethanes include Urepal™ PU147 and PU181 from CHEMIPAL S.p.A.; Mellon™ Promul 61 from STAHL; Astacin™ Finish PS from BASF; Ecrothan™ 4075, 4078 and 4084 from MICHELMAN; Incorez™ CS8073 and CS065-195 from INCOREZ. The dry weight of the polyurethane in the base coat is preferably in the range of 1 to 6 $g/m^2$.

Suitable polyamides include the PA emulsion types ED310 and 161148 CX from MICHELMAN. The dry weight of the polyamide in the base coat is preferably less than 7 $g/m^2$, more preferably less than 5 $g/m^2$.

Although polyurethanes and/or polyamides are preferred as the polymers for the base" coat, other polymers may be used preferably in combination with the polyurethanes and/ or polyamides. Such polymers preferably have an elongation at break of more than 200%, more preferably 300%. The elongation at break is measured according to ISO527-2, for example, with a MTS Exceed™ testing apparatus from MTS Systems Corporation.

A suitable polymeric acrylate emulsion is Bioflex™ KGA from LMF Biokimica.

A cross-linker may be incorporated in the protective top coat to improve the scratch resistance. Preferred cross-linkers include those mentioned above for the base coat. The dry weight of the cross-linker in the protective top coat is preferably less than 1.4 $g/m^2$, more preferably less than 1.0 $g/m^2$.

The protective top coat may be applied by spraying or using the same coating techniques as mentioned above for the base coat.

If a matt top surface is desired for the inkjet printed leather, a matting agent may be included. Any suitable matting may be used. Preferred matting agent include silica. A preferred commercially available example of a silica dispersion is Euderm™ SN2 from LANXESS.

Computer Server

The computer server (8) operates a program. Part or whole of the computer server and/or the functional units or blocks thereof may be implemented in one or more circuits or circuitry, such as an integrated circuit(s) or as an LSI (large scale integration). Each functional unit or block of the computer server may be individually made into an integrated circuit chip. Alternatively, part or whole of the functional units or blocks may be integrated and made into an integrated circuit chip.

A program which is operated in the computer server is a program controlling a processor in order to realize functions of the various preferred embodiments according to the present invention. Therefore, information which is handled by the computer server is temporarily accumulated in a RAM at the time of the processing. Thereafter, the information may be stored in various types of circuitry in the form of ROMs and HDDs, and read out by circuitry within, or included in combination with, the computer server as necessary, and modification or write-in is performed thereto. As a recording medium storing the program, any one of a semiconductor medium (for example, the ROM, a non-volatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

Moreover, in a case of being distributed in a market, the program can be distributed by being stored in the portable recording medium, or the program can be transmitted to a server computer which is connected through a network such as the Internet. In addition, a portion of a terminal device, a wireless base station, a host system, or other devices, or the whole thereof may be realized as an LSI which is typically an integrated circuit. Each functional unit or block of the computer server may be individually chipped, or a portion thereof, or the whole thereof may be chipped by being integrated. In a case of making each functional block or unit as an integrated circuit, an integrated circuit controller that controls the integrated circuits, is added.

Finally, it should be noted that the description referring to "circuit" or "circuitry" is in no way limited to an implementation that is hardware only, and as persons of ordinary skill in the relevant art would know and understand, such descriptions and recitations of "circuit" or "circuitry" include combined hardware and software implementations in which the circuit or circuitry is operative to perform functions and operations based on machine readable programs, software or other instructions in any form that are usable to operate the circuit or circuitry.

There is no limitation on the location of the computer server (18), it may be located at the tannery (3), at the leather article manufacturer (10), at the shop (12) or even at a third party location.

Digital connections (14 to 17) with the computer server may be made in any form. It can be a connection using an optical fiber or a wireless connection, such as a wifi connection according to the IEEE 802.11 standard.

Inkjet Printing Devices

The one or more pigmented inkjet ink are jetted by one or more print heads ejecting small droplets in a controlled manner through nozzles onto natural leather moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so-called through-flow piezoelectric drop-on-demand print head. By using through-flow print heads, the reliability is enhanced and thus a more efficient and economical method of manufacturing high quality decorated natural leather articles is obtained. Such a print head is, for example, available from TOSHIBA TEC as the CF1ou print head.

However, the inkjet printing method according to the present invention is not restricted to piezoelectric inkjet printing. Other inkjet print heads can be used and include various types, such as a continuous type print head.

The inkjet print head normally scans back and forth in a transversal direction across the moving leather surface, known as a multi-pass printing mode. Sometimes the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads that cover the entire width of the leather surface. In a single pass printing process, the inkjet print heads usually remain stationary and the ink-receiver surface is transported under the inkjet print heads.

An advantage of using a multi-pass printing mode is that the liquid UV curable inkjet ink is cured in a consecutive passes, rather than in a single pass that would require a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer is usually much lower, especially for large format crusted leather.

Curing Devices

If aqueous or solvent based pigmented inkjet inks are used, then some curing device for evaporation of water and organic solvents is required. Suitable curing means include a heat radiation means like a hot air dryer, an oven, or an infrared light source, such as an infrared laser, one or more infrared laser diodes or infrared LEDs.

An effective infrared radiation source for aqueous inkjet inks has an emission maximum between 0.8 and 1.5 µm. Such an infrared radiation source is sometimes called a NIR dryer.

If UV curable based pigmented inkjet inks are used, then curing is performed by ultraviolet radiation.

In inkjet printing, the UV curing device may be arranged in combination with the print head of the inkjet printer, travelling therewith so that the UV curable inkjet ink is exposed to curing radiation very shortly after been jetted.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:
UV-A: 400 nm to 320 nm
UV-B: 320 nm to 290 nm
UV-C: 290 nm to 100 nm.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed and a high curing degree.

In a particularly preferred embodiment, the UV curing is performed using UV LEDs having an emission wavelength higher than 370 nm.

For facilitating curing, the inkjet printer may include one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLE

Materials

All materials used in the following examples were readily available from standard sources such as Aldrich Chemical Co. (Belgium) and Acros (Belgium) unless otherwise specified. The water used was demineralized water.

PB15:4 is an abbreviation used for Hostaperm™ Blue P-BFS, a C.I. Pigment Blue 15:4 pigment from CLARIANT.

MP1 is an abbreviation used for Ink Jet Magenta E7B LV3958, a quinacridone pigment from CLARIANT.

MP2 is an abbreviation used for Chromophtal™ Jet Magenta 2BC, a quinacridone pigment from BASF.

PY150 is a C.I. Pigment Yellow 150 pigment for which Cromophtal yellow LA2 from BASF was used.

PB7 is a carbon black pigment for which Special Black™ 550 from EVONIK was used.

SYN is the dispersion synergist according to Formula (A):

Formula (A)

and was synthesized in the same manner as described in Example 1 of WO 2007/060254 (AGFA GRAPHICS) for the synergist QAD-3.

E7701 is a polyacrylate dispersion agent available as Efka™ 7701 from BASF.

S35000 is an abbreviation used for SOLSPERSE™ 35000, a polyethyleneimine-polyester hyperdispersant from LUBRIZOL.

PEA is 2-phenoxyethyl acrylate available as Sartomer™ SR339C from ARKEMA.

IBOA is isobornylacrylate available as Sartomer™ SR506D from ARKEMA.

IDA is isodecyl acrylate available as Sartomer™ SR395 from ARKEMA.

THFFA is tetrahydrofurfuryl acrylate, available as Sartomer™ SR285 from ARKEMA.

VCL is N-vinyl caprolactam available from BASF BELGIUM, NV.

VEEA is 2-(2'-vinyloxyethoxy)ethyl acrylate, a difunctional monomer available from NIPPON SHOKUBAI, Japan.

DPGDA is dipropylene glycol diacrylate available as Sartomer™ SR508 from ARKEMA.

CN963B80 is a urethane acrylate oligomer available as Sartomer™ CN963B80 from ARKEMA.

CN3755 is an acrylated amine synergist available as Sartomer™ CN 3755 from ARKEMA.

TPO is trimethylbenzoyl diphenyl phosphine oxide supplied as Omnirad™ TPO by IGM.

ITX is Darocur™ ITX is an isomeric mixture of 2- and 4-isopropylthioxanthone from BASF.

BAPO is a bis(2,4,6-trimethylbenzoyl)-phenylphosphineoxide photoinitiator available as Irgacure™ 819 from BASF.

INHIB is a mixture forming a polymerization inhibitor having a composition according to Table 1.

TABLE 1

| Component | wt % |
|---|---|
| DPGDA | 82.4 |
| p-methoxyphenol | 4.0 |
| BHT | 10.0 |
| Cupferron ™ AL | 3.6 |

Cupferron™ AL is aluminum N-nitrosophenylhydroxylamine from WAKO CHEMICALS LTD.

UV10 is 4-hydroxy-2,2,6,6-tetramethylpiperidinooxy sebacate available as Irgastab™ UV 10 from BASF.

T410 is a silicone surfactant available as Tegoglide™ 410 from EVONIK.

SL7500 is a silicone surfactant available as Silwet™ L7500 from OSI SPECIALITIES BENELUX NV.

PA is an anionic polyamide dispersion available as Michem™ Emulsion D310 from MICHELMAN.

PU is a waterbased polyurethane dispersion available as Urepal™ PU147 from CHEMIPAL S.p.A.

XL is a solvent-based aliphatic polyisocyanate available as Urepal™ CT70 from CHEMIPAL S.p.A.

Measurement Methods

1. Viscosity

The viscosity of the UV curable inkjet inks was measured at 45° C. and at a shear rate of 1,000 s$^{-1}$ using a Rotovisco™ RV1 viscometer from HAAKE.

2. Surface Tension

The static surface tension of the UV curable inkjet inks was measured with a KRÜSS tensiometer K9 from KRÜSS GmbH, Germany at 25° C. after 60 seconds.

3. Average Particle Size

The average particle size (diameter) was determined with a Brookhaven Instruments Particle Sizer BI90plus based upon the principle of dynamic light scattering. The inkjet ink was diluted with ethyl acetate to a pigment concentration of 0.002 wt %. The measurement settings of the BI90plus were: 5 runs at 23° C., angle of 90°, wavelength of 635 nm and graphics=correction function.

4. Flexibility

The flexibility was determined on a SATRA™ 701 Bally flexometer wherein samples had to endure a cycle of a multiple of 1,000 flexes. The amount of cracks in the leather after the test determines the score. The cracks are evaluated by the naked eye and by a microscope at a 8× magnification according to a criterion shown in Table 2.

TABLE 2

| Score | Criterion |
|---|---|
| A | No cracks visible by the naked eye or by microscope |
| B | No cracks visible by the naked eye, but some cracks visible by microscope |
| C | Some cracks visible by the naked eye |
| D | Large amount of cracking visible by the naked eye |

5. Readability

The inkjet printed identification code was decoded using a webcam connected by a USB cable to a computer running the Arziro™ Ensure software from Agfa Graphics nv. The readability was accorded a score of "OK" if the information coded into the identification code could be fully retrieved. In the alternative case, it was accorded a score of "Fail".

Example 1

This example illustrates the manufacturing of decorating natural leather wherein a decorative image and an identification code is applied on a base coat using pigmented UV curable inkjet inks.

Preparation of Pigmented UV Curable Inkjet Inks

First concentrated pigment dispersions CPC, CPM1, CPM2, CPY and CPK were prepared. Then these concentrated pigment dispersions were used to prepare a pigmented UV curable inkjet ink set according to Table 8.

Concentrated Cyan Pigment Dispersion CPC

A concentrated pigment dispersion was made by mixing the components according to Table 3 for 30 minutes using a DISPERLUX™ disperser from DISPERLUX S.A.R.L., Luxembourg. The dispersion was then milled using a Bachofen DYNOMILL ECM mill filled with 0.4 mm yttrium stabilized zirconia beads ("high wear resistant zirconia grinding media" from TOSOH Co.). The mixture was circulated over the mill for 2 hours. After milling, the concentrated pigment dispersion was discharged over a 1 µm filter into a vessel. The wt % in Table 3 is based on the total weight of the pigment dispersion.

TABLE 3

| Component | wt % |
|---|---|
| PB15:4 | 16.00 |
| S35000 | 16.00 |
| INHIB | 1.00 |
| DPGDA | 67.00 |

Concentrated Magenta Pigment Dispersion CPM1

The concentrated pigment dispersion CPM1 was prepared in the same manner as described above for the cyan pigment dispersion CPC except that the ingredients used were according to Table 4.

TABLE 4

| Component | wt % |
|---|---|
| MP1 | 15.00 |
| SYN | 0.30 |
| E7701 | 15.00 |
| INHIB | 1.00 |
| PEA | 15.00 |
| DPGDA | 53.70 |

Concentrated Magenta Pigment Dispersion CPM2

The concentrated pigment dispersion CPM2 was prepared in the same manner as described above for the cyan pigment dispersion CPC except that the ingredients used were according to Table 5.

TABLE 5

| Component | wt % |
|---|---|
| MP2 | 16.00 |
| SYN | 0.24 |
| S35000 | 16.00 |

TABLE 5-continued

| Component | wt % |
|---|---|
| INHIB | 1.00 |
| PEA | 15.00 |
| DPGDA | 66.76 |

Concentrated Yellow Pigment Dispersion CPY

The concentrated pigment dispersion CPY was prepared in the same manner as described above for the cyan pigment dispersion CPC except that the ingredients used were according to Table 6.

TABLE 6

| Component | wt % |
|---|---|
| PY150 | 16.00 |
| S35000 | 16.00 |
| INHIB | 1.00 |
| DPGDA | 67.00 |

Concentrated Black Pigment Dispersion CPK

The concentrated pigment dispersion CPK was prepared in the same manner as described above for the cyan pigment dispersion CPC except that the ingredients used were according to Table 7.

TABLE 7

| Component | wt % |
|---|---|
| PB7 | 16.00 |
| S35000 | 16.00 |
| INHIB | 1.00 |
| DPGDA | 67.00 |

Pigmented UV Curable Inkjet Ink Set

The UV curable inkjet ink set was prepared using the above prepared concentrated pigment dispersions and combining them with the other components according to Table 8. The wt % is based on the total weight of the inkjet ink.

TABLE 8

| wt % of: | C | Light C | M | Light M | Y | K |
|---|---|---|---|---|---|---|
| PB15:4 | 2.50 | 0.62 | — | — | — | 0.60 |
| MP1 | — | — | 4.00 | 1.00 | — | — |
| MP2 | — | — | — | — | — | 0.30 |
| SYN | — | — | 0.08 | 0.02 | — | 0.01 |
| PY150 | — | — | — | — | 2.45 | — |
| PB7 | — | — | — | — | — | 1.60 |
| E7701 | — | — | 4.00 | 1.00 | 1.63 | — |
| S35000 | 2.50 | 0.62 | — | — | — | 2.50 |
| IBOA | 18.95 | 18.95 | 18.95 | 18.95 | 18.95 | 18.95 |
| VCL | 9.90 | 7.50 | 7.50 | 9.70 | 10.00 | 9.50 |
| PEA | 16.35 | 20.00 | 12.00 | 25.23 | 17.25 | 16.15 |
| THFFA | 14.12 | 13.35 | 15.13 | 5.88 | 13.74 | 12.47 |
| IDA | 5.00 | 5.00 | 5.00 | 5.00 | 5.00 | 5.00 |
| DPGDA | 10.47 | 7.11 | 18.33 | 9.35 | 10.79 | 10.48 |
| CN963B80 | 4.00 | 7.50 | — | 4.50 | 4.00 | 3.00 |
| ITX | 2.00 | 0.50 | 2.95 | 0.50 | 2.00 | 5.00 |
| TPO | 2.95 | 9.95 | 2.95 | 9.95 | 2.95 | 2.95 |
| BAPO | 2.25 | — | 3.50 | — | 2.25 | 2.00 |
| CN3755 | 7.50 | 7.50 | 4.00 | 7.50 | 7.50 | 8.00 |
| INHIB | 0.16 | 0.04 | 0.27 | 0.07 | 0.14 | 0.15 |
| UV10 | 0.35 | 0.35 | 0.35 | 0.35 | 0.35 | 0.35 |
| SL7500 | 1.00 | 1.00 | 1.00 | 1.00 | 1.00 | 1.00 |

Light cyan and Light magenta inkjet inks were included in the ink set to further enhance the image quality. Light inks reduce graininess in the inkjet printed image when low density colours are present in the image.

The inkjet inks exhibited the following properties according to Table 9.

TABLE 9

| Physical property | C | Light C | M | Light M | Y | K |
|---|---|---|---|---|---|---|
| Viscosity (45° C.) | 9.6 | 9.9 | 10.9 | 10.2 | 10.1 | 10.2 |
| Surface tension (mN/m) | 30.6 | 29.2 | 27.9 | 29.6 | 28.6 | 29.7 |
| Average particle size (nm) | 129 | 147 | 169 | 175 | 191 | 123 |

Preparation of Base Coat BC1

A base coat BC1 was prepared by mixing the following ingredients according to Table 10.

TABLE 10

| wt % of: | BC1 |
|---|---|
| PA | 20.0 |
| PU | 10.0 |
| XL | 0.9 |
| Water | 69.1 |

Preparation of Protective Top Coat TC1

A protective top coat TC1 was prepared by mixing the following ingredients according to Table 11.

TABLE 11

| wt % of: | TC1 |
|---|---|
| PA | 20.0 |
| PU | 50.0 |
| XL | 2.0 |
| Water | 28.0 |

Evaluation and Results

An inkjet printed leather sample LS1 was prepared in the following manner.

First, a base coat BC1 was applied on a chrome tanned calfskin leather (wet blue) from Jan de Ruijter Waalwijk B. V. using a Starlab™ 800 roller coater from GEMATA set up with a 30 F coating and lacquering roll. The coated leather was dried using a Radicure™ D dryer set to a temperature of 280° C. wherein the speed of the conveyor belt is set to the lowest value resulting in a drying time of 2.5 min.

Figure 7:
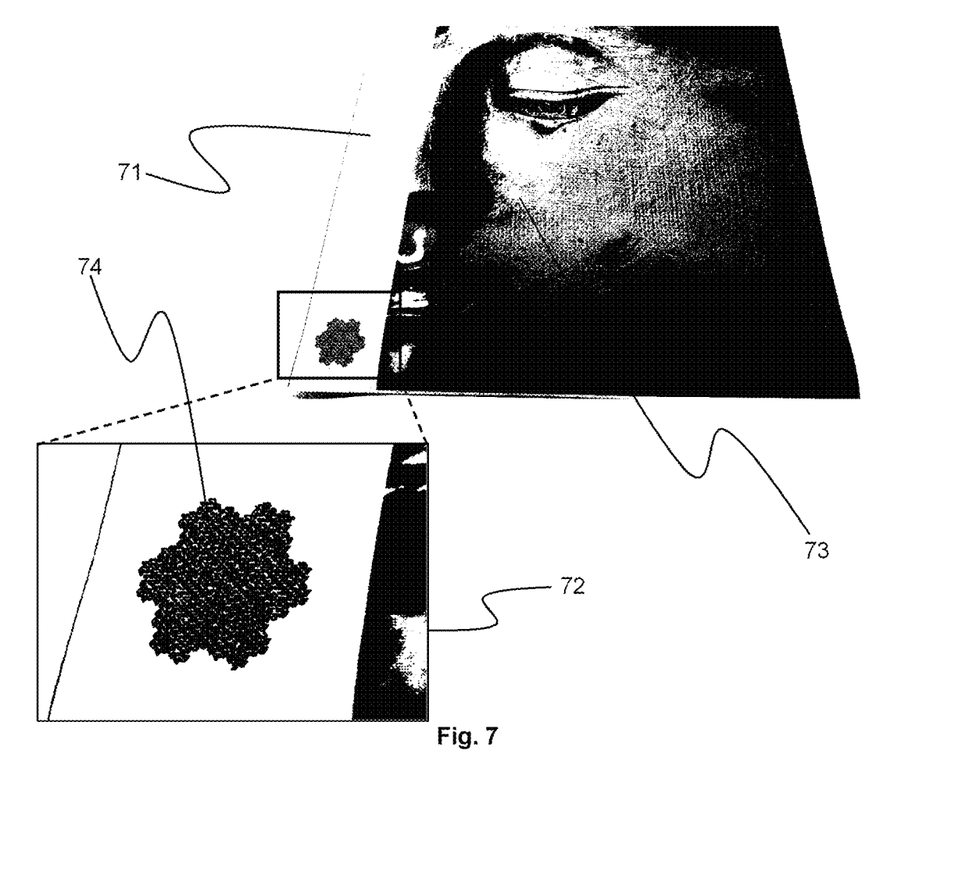
FIG. 7 is a photograph of an inkjet printed leather (71) containing a decorative image (73) and an identification code (74), the latter shown in a close-up (72) part of the photograph.

A colour image, as shown in FIG. 7, was printed using a Jeti™ Titan from Agfa Graphics with the above pigmented UV curable inkjet inks. An identification code (74) in FIG. 7 was inkjet printed, in this example, outside of the decorative image to make it clearly visible. The identification was designed with Arziro™ Ensure software from Agfa Graphics nv, in accordance with the technology described in WO 2015/140157 A (AGFA).

After inkjet printing, a protective top coat TC1 was applied on the inkjet printed image in the same manner as the application of the base coat BC1 was performed.

Finally, the leather samples were heat pressed in a Secabo™ TPD12 pneumatic transfer press at a temperature of 175° C. and a pressure of 4 bar for 35 seconds.

The flexibility and the readability of the identification code were evaluated for the inkjet printed leather sample LS1. The results are shown in Table 12.

TABLE 12

| Sample | Flexibility (20,000 flexes) | Readability Identification code |
|---|---|---|
| LS1 | A | OK |

REFERENCE SIGNS LIST

TABLE 13

| | |
|---|---|
| 1 | Cow |
| 2 | Hide |
| 3 | Tannery |
| 4 | Inkjet printing |
| 5 | Inkjet printed leather |
| 6 | Magnification of part of Inkjet printed leather |
| 7 | Inkjet printed leather piece |
| 8 | Printed decoration |
| 9 | Printed identification code |
| 10 | Leather article manufacturer |
| 11 | Website |
| 12 | Shop |
| 13 | Leather article |
| 14 to 17 | Digital connection |
| 18 | Computer server |
| 21 | Printed leather |
| 22 | Equilateral triangle |
| 23 | Markers |
| 24 | Non-equilateral triangle |
| 31 | Grain |
| 32 | Junction of grain and corium |
| 33 | Corium |
| 34 | Full grain leather |
| 35 | Top grain leather |
| 36 | Split leather |
| 41 | Inkjet printed leather |
| 42 | Topcoat |
| 43 | Decorative image |
| 44 | Base coat |
| 45 | Crusted leather |
| 51 | Leather image |
| 52 | Non-printable area |
| 53 | Printable area |
| 54 | Leather image containing nested sub-images |
| 55 | Sub-image (intended leather piece) |
| 61 | QR Code |
| 62 | Data Matrix |
| 63 | Cool Data Matrix |
| 64 | Aztec |
| 65 | Shotcode |
| 66 | Beetagg |
| 71 | Inkjet printed leather |
| 72 | Close-up |
| 73 | Decorative image |
| 74 | Identification code |

The invention claimed is:

1. A manufacturing method of decorated natural leather, the method comprising:
    applying a base coat on crusted leather;
    inkjet printing a decorative image on the base coat using one or more pigmented inkjet inks;
    applying one or more identification codes;
    applying a top coat onto the decorative image and the base coat; and
    heat pressing or embossing the crusted leather, the base coat, the decorative image, and the top coat.

2. The manufacturing method according to claim 1, wherein the one or more identification codes are applied by inkjet printing.

3. The manufacturing method according to claim 1, wherein at least one of the one or more identification codes is machine readable.

4. The manufacturing method according to claim 1, wherein the one or more identification codes define a portion of the decorative image.

5. The manufacturing method according to claim 1, wherein the one or more pigmented inkjet inks are UV curable pigmented inkjet inks.

6. The manufacturing method according to claim 2, wherein the base coat includes a polymer or copolymer based on polyurethane.

7. A manufacturing method of decorated natural leather, the method comprising:
- applying a base coat on crusted leather;
- inkjet printing a decorative image on the base coat using one or more pigmented inkjet inks; and
- applying one or more identification codes, wherein the one or more identification codes are applied before the step of inkjet printing the decorative image on the base coat.

8. A decorated natural leather comprising:
- one or more identification codes;
- a crusted leather including a base coat;
- a decorative image inkjet printed on the base coat; and
- a top coat on the decorative image and the base coat,
- wherein the crusted leather, the base coat, the decorative image, and the top coat are embossed.

9. The decorated natural leather according to claim 8, wherein at least one of the one or more identification codes is machine readable.

10. The decorated natural leather according to claim 9, wherein the base coat includes a polymer or copolymer based on polyurethane.

11. A leather article comprising:
- the decorated natural leather according to claim 8; wherein
- the leather article is selected from the group consisting of footwear, furniture, upholstery, bags, luggage, gloves, belts, wallets, clothing, automotive leather seats, interior decoration, packaging, equestrian leather articles, books, and stationary.

12. The decorated natural leather according to claim 8, wherein
the one or more identification codes serves at least one of the following purposes:
- a) identifying a leather article to be manufactured using the decorated natural leather by a leather article manufacturer for a customer;
- b) identifying a leather article manufacturer;
- c) cutting the decorate natural leather into leather pieces;
- d) identifying a customer of a leather article;
- e) authentication of a leather article;
- f) delivering a leather article to a customer; and
- g) customer engagement.

13. The decorated natural leather according to claim 12, wherein at least one of the one or more identification codes is machine readable.

\* \* \* \* \*